(12) United States Patent
Schmid et al.

(10) Patent No.: US 11,555,941 B1
(45) Date of Patent: Jan. 17, 2023

(54) PULSED NEUTRON LOGGING FOR PETROLITHIUM

(71) Applicant: Weatherford Technology Holdings, LLC, Houston, TX (US)

(72) Inventors: Gregory Schmid, Sugar Land, TX (US); Richard Pemper, Sugar Land, TX (US); Natasa Mekic, Spring, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 17/406,379

(22) Filed: Aug. 19, 2021

(51) Int. Cl.
*G01V 5/10* (2006.01)
(52) U.S. Cl.
CPC ..................... *G01V 5/108* (2013.01)
(58) Field of Classification Search
CPC ......... G01V 5/108; G01V 5/102; G01V 5/101
See application file for complete search history.

(56) References Cited

U.S. PATENT DOCUMENTS

| 4,052,613 | A | 10/1977 | Murphy et al. |
| 11,048,015 | B2 | 6/2021 | Schmid et al. |
| 2012/0126106 | A1 | 5/2012 | Zhou et al. |
| 2017/0285219 | A1 | 10/2017 | Brady et al. |
| 2021/0025272 | A1 * | 1/2021 | Boul ................. C09K 8/34 |

FOREIGN PATENT DOCUMENTS

| CN | 112878998 A | 6/2021 | |
| WO | WO-2016200423 A1 * | 12/2016 | ............ C09K 8/03 |

OTHER PUBLICATIONS

Daitch, Pamela Joy, Thesis titled "Lithium Extraction from Oilfield Brine," Graduate School of the University of Texas at Austin, 2018, 141 pages.
International Search Report and Written Opinion regarding corresponding PCT Application No. PCT/US2022/072231, dated Aug. 30, 2022.

* cited by examiner

*Primary Examiner* — David P Porta
*Assistant Examiner* — Fani Polyzos Boosalis
(74) *Attorney, Agent, or Firm* — Lewis & Reese, PLLC

(57) ABSTRACT

Methods, tools, and systems for determining the lithium concentration of a formation traversed by a wellbore using pulsed neutron logging are described. Since determining lithium directly using pulsed neutron logging is problematic, this disclosure provides ways of determining lithium concentration indirectly using models that relate lithium concentration with concentrations of other elements that are predicted to be associated with lithium.

22 Claims, 8 Drawing Sheets

PULSED NEUTRON LOGGING FOR PETROLITHIUM

FIELD OF THE INVENTION

The present application relates to logging of boreholes in oil and gas operations, and more particularly, to pulsed-neutron logging to determine lithium.

INTRODUCTION

Growth in the electric vehicle and renewable energy storage markets has led to an increased need for lithium (Li) for use in Li-ion batteries. This need is expected to accelerate in the future, and has motivated searches for new sources of Li. One potential source of Li is oil-field brine. Significant quantities of bine are brought to the surface when an oil well is produced. Brines produced from some of the formations traversed by the oil well may contain lithium, which may be recovered, for example, by evaporation. Such lithium is referred to as "petrolithium."

It would be desirable to determine which formations traversed by a wellbore contain high concentrations of lithium so that brines from those formations could be preferentially targeted for lithium recovery. Also, logging for the lithium content as a function of depth in a wellbore may allow the casing within lithium-rich formations to be perforated to produce lithium-rich brines.

SUMMARY

Methods of determining a concentration of lithium contained within a brine in a formation traversed by a wellbore are disclosed herein. According to some embodiments the method comprises: using data from a pulsed neutron logging tool in the wellbore to determine a concentration of one or more proxy elements in the brine, wherein the one or more proxy elements do not comprise lithium, and using the determined concentration of the one or more proxy elements to determine the concentration of lithium in the brine. According to some embodiments, the one or more proxy elements comprise boron or chlorine. According to some embodiments, the data comprises a thermal neutron capture energy spectrum. According to some embodiments, using the determined concentration of the one or more proxy elements to determine the concentration of lithium comprises using a model that models lithium concentration as a function of concentrations of the one or more proxy elements. According to some embodiments, the model models lithium concentration as a function of two or more proxy elements. According to some embodiments, the function is a product of the two or more proxy elements. According to some embodiments, the model is determined using a database comprising elemental concentration values determined for brines produced from a plurality of wells, wherein the elemental concentration values for each of the wells comprise concentration values for lithium and concentration values for the one or more proxy elements. According to some embodiments, the model models lithium concentration as a function of concentrations of the one or more proxy elements combined with fluid sigma. According to some embodiments, the fluid sigma for the model is determined based on the database. According to some embodiments, the model models lithium concentration as a product of the one or more proxy elements multiplied by the fluid sigma. According to some embodiments, the model models lithium concentration as a product of the boron concentration times fluid sigma. According to some embodiments, the model models lithium concentration as a product of the boron and the chlorine concentrations. According to some embodiments, the data from the pulsed neutron logging tool further comprises a neutron capture time decay spectrum. According to some embodiments, the method further comprises using the neutron capture time decay spectrum to determine a fluid sigma value for the brine. According to some embodiments, determining the fluid sigma value for the brine comprises: fitting a dual exponential decay function to the capture time decay spectrum, using the dual exponential decay function to determine a borehole contribution and a formation contribution to the neutron capture time decay spectrum, and using the formation contribution to the neutron capture time decay spectrum to determine the fluid sigma value for the brine.

Also disclosed herein is a non-transitory computer-readable medium comprising instructions for execution by a computer for determining a concentration of lithium contained within a brine in a formation traversed by a wellbore, wherein the instructions are configured to cause the computer to: receive data generated using a pulsed neutron logging tool in the wellbore, use the data to determine a concentration of one or more proxy elements in the brine, wherein the one or more proxy elements do not comprise lithium, and use the determined concentration of the one or more proxy elements to determine the concentration of lithium in the brine. According to some embodiments, the one or more proxy elements comprise boron or chlorine. According to some embodiments, the data from the pulsed logging tool comprises a thermal neutron capture energy spectrum. According to some embodiments, the instructions further comprises a model that models lithium concentration as a function of concentrations of the one or more proxy elements. According to some embodiments, the model is determined using a database comprising elemental concentration values determined for brines produced from a plurality of wells, wherein the elemental concentration values for each of the wells comprise concentration values for lithium and concentration values for the one or more proxy elements. According to some embodiments, the model models lithium concentration as a function of concentrations of the one or more proxy elements combined with fluid sigma. According to some embodiments, the instructions further configure the computer to use the data to determine a fluid sigma value for the brine.

The invention may also reside in a non-transitory computer-readable medium comprising instructions, such as programming code, which, when executed on a computing device, configures the computing device to perform the methods described above. The invention may also reside in a computing device configured to perform the methods described above.

BRIEF DESCRIPTION OF THE DRAWINGS

FIG. 4A shows a temporal profile of gamma ray count rate at a detector. FIG. 4B shows two simulated capture spectra overlaid: one with a brine formation fluid that has 0 ppm boron content and one with a brine formation fluid that has a 1000 ppm boron content.

DESCRIPTION

This disclosure relates to methods and systems for using pulsed neutron logging measurements to log for lithium in formations traversed by a wellbore. Oil and gas well service providers use a variety of measurements to determine if wells are producing to their potential, if they are maintaining their integrity, and if interventions are needed to improve production or to otherwise repair or rejuvenate aging wells. Pulsed neutron measurements are one type of measurement available to well service providers. Pulsed neutron measurements can be used to identify oil and gas in geological formations, evaluate hydrocarbon production, characterize the porosity of formations, and determine the condition of certain features of a well, such as gravel pack integrity. The inventors have discovered that pulsed neutron logging can also be used to log for the presence/concentration of lithium in formations traversed by a wellbore.

Figure 1:
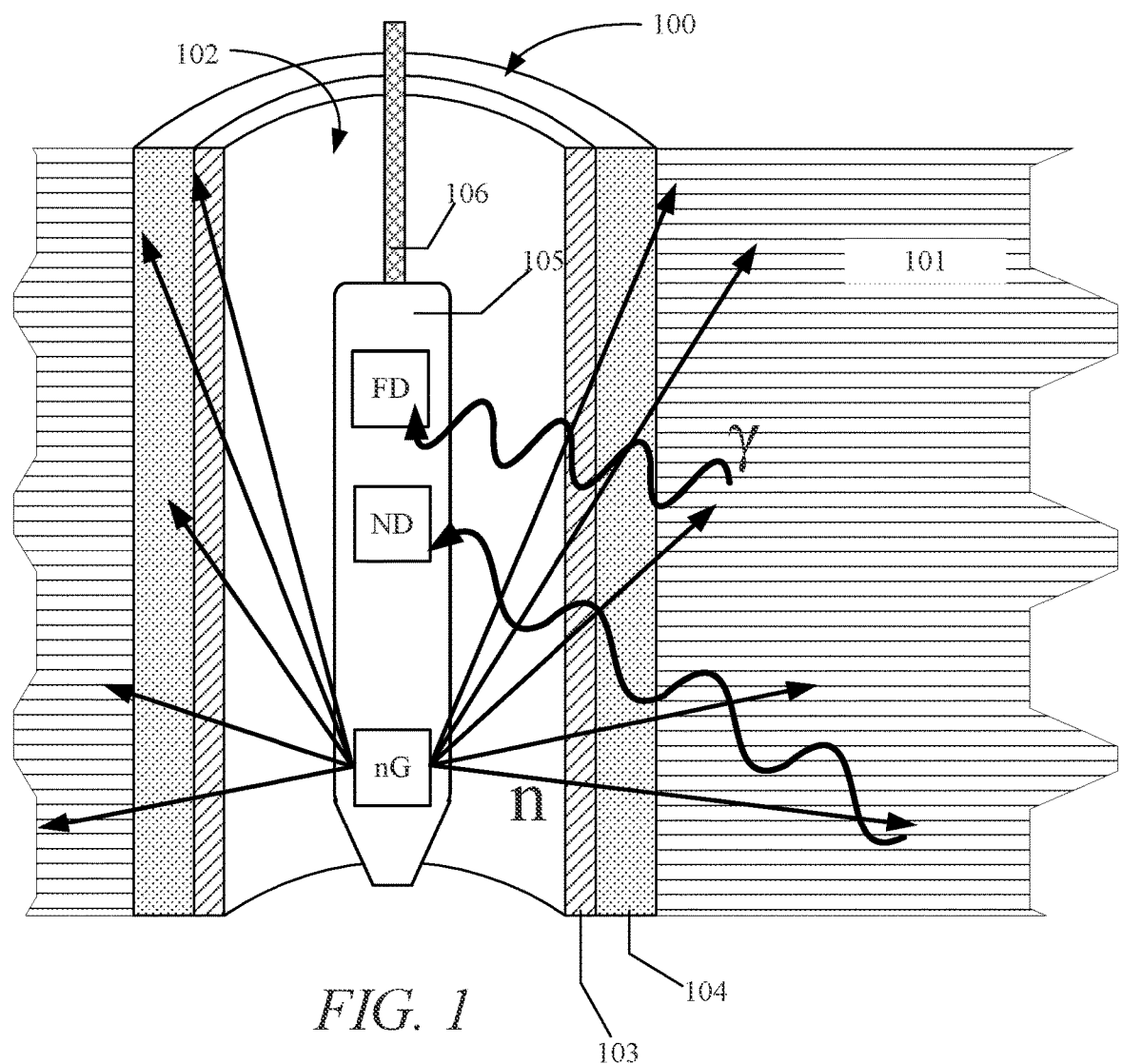
FIG. 1 shows a pulsed neutron logging tool conveyed into a wellbore.

A well service provider uses a tool called a pulsed neutron logging tool to perform pulsed neutron measurements. FIG. 1 illustrates a section of a wellbore 100 extending into a formation 101. The illustrated wellbore 100 is stabilized by a casing 103 held against the formation 101 by cement 104. The cylindrical volume 102, which is that part of the wellbore located inside the inner radius of the casing annulus, is filled with a borehole fluid and/or gas. Note that the methods and tools described in this disclosure are not limited to use in cased wellbores and may be used in open hole applications as well A pulsed neutron logging tool 105 is lowered into the wellbore using a wireline 106 or another mode of conveyance, as described in more detail below. The pulsed neutron logging tool 105 includes a neutron generator nG, and one or more detectors, labeled here as ND (near detector) and FD (far detector) in FIG. 1. Each component will be described in more detail below.

During a puked neutron measurement, the neutron generator nG generates neutrons, which are released from the pulsed neutron logging tool 105 at greater than 1 MeV and typically about 14 MeV. The neutrons are represented as straight arrows labeled n in FIG. 1. The high-energy neutrons can undergo a variety of interactions with matter in the cylindrical volume 102, the casing 103, the cement 104, and the formation 101.

Figure 2:
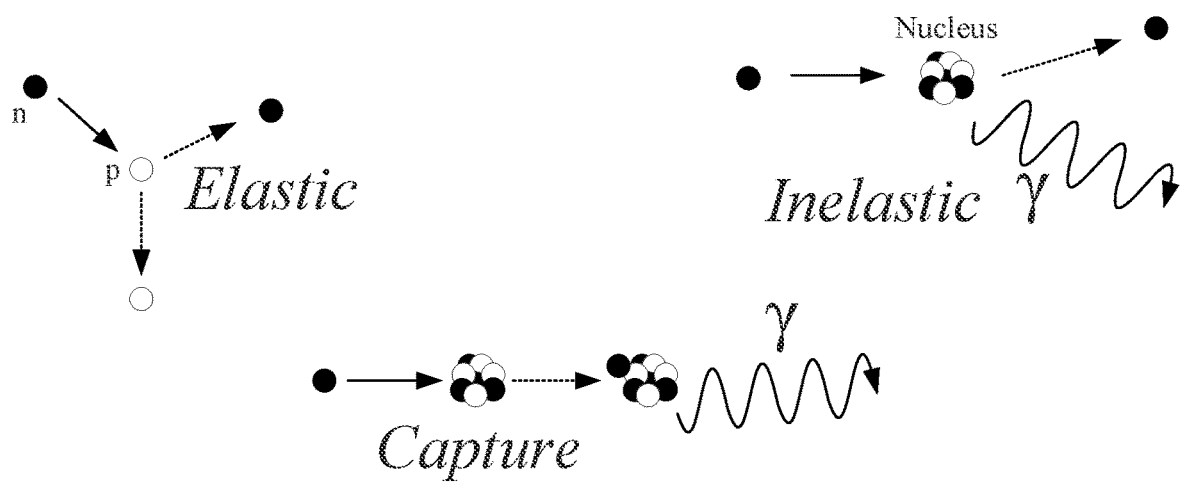
FIG. 2 shows interactions of fast neutrons.

FIG. 2 illustrates three types of such interactions. One possible interaction is an elastic collision, also called elastic scattering, between a neutron n and a nucleus. In the illustrated example, the neutron n collides with a hydrogen nucleus having a single proton p. Hydrogen is omnipresent in most formations due to the pore spaces being filled with liquid hydrocarbons or water. In the elastic scattering process, the neutron n imparts some of its energy to the proton p, causing the proton to gain energy and the neutron to lose energy (i.e., to slow down). Elastic scattering plays a major role in the slowing down of fast neutrons. It is well known in the art that the liquid-filled porosity can be inferred by measuring the slowing down distance of fast neutrons.

In an inelastic collision, also called inelastic scattering, a neutron collides with a nucleus, imparting a portion of the neutron's energy to the nucleus. The neutron exits the collision with less energy than before. The energy that is transferred to the nucleus excites the nucleus, which subsequently emits a gamma ($\gamma$) photon when the nucleus relaxes. Nuclei of different atoms emit gamma photons having different energies. Therefore, the energy of the emitted gamma photon is indicative of the type of nucleus involved in an inelastic collision. For example, one can determine the ratios of carbon (indicative of hydrocarbons), oxygen (indicative of water), silicon (indicative of sandstone), and calcium (indicative of limestone) by measuring the energies of gamma photons generated during inelastic collisions with atoms of those substances near a wellbore.

Notice that both elastic and inelastic scattering cause neutrons to lose energy. After a high energy neutron has undergone a number of collisions, its energy will be reduced. Neutrons having an energy above approximately 0.5 MeV are considered fast neutrons. Fast neutrons can trigger gamma rays due to inelastic scattering, as described above. Neutrons that are slowed to about 0.4 to 100 eV are considered "epithermal neutrons" and neutrons that are slowed to about 0.025 eV are referred to as "thermal neutrons." Epithermal and thermal neutrons can participate in a third type of interaction whereby the neutron is "captured" by the nucleus of an atom. This capture forms a compound state that can then decay by particle and/or gamma emission. In addition, any residual nuclei that remain after the decay can also, in some cases, decay by particle and/or gamma emission. The gamma rays emitted following a neutron capture on a nucleus have a tendency to be characteristic of that particular nucleus. As such, the type of atom participating in the capture event can be identified based on the energy spectrum of the emitted photons. The strength of the photon signal from a given element is related to the probability for neutron capture on that particular element. This probability is quantified as the "capture cross section" and has units of "barns." When multiplied by the number density of that particular type of atom in the formation, the result is the "macroscopic cross section," also called "sigma," and is typically expressed in "capture units" (c.u.). The sigma values for all the elements in the formation will add together to give the total formation sigma value (E). The higher the sigma value, the quicker a population of thermal neutrons will decay.

Figure 3:
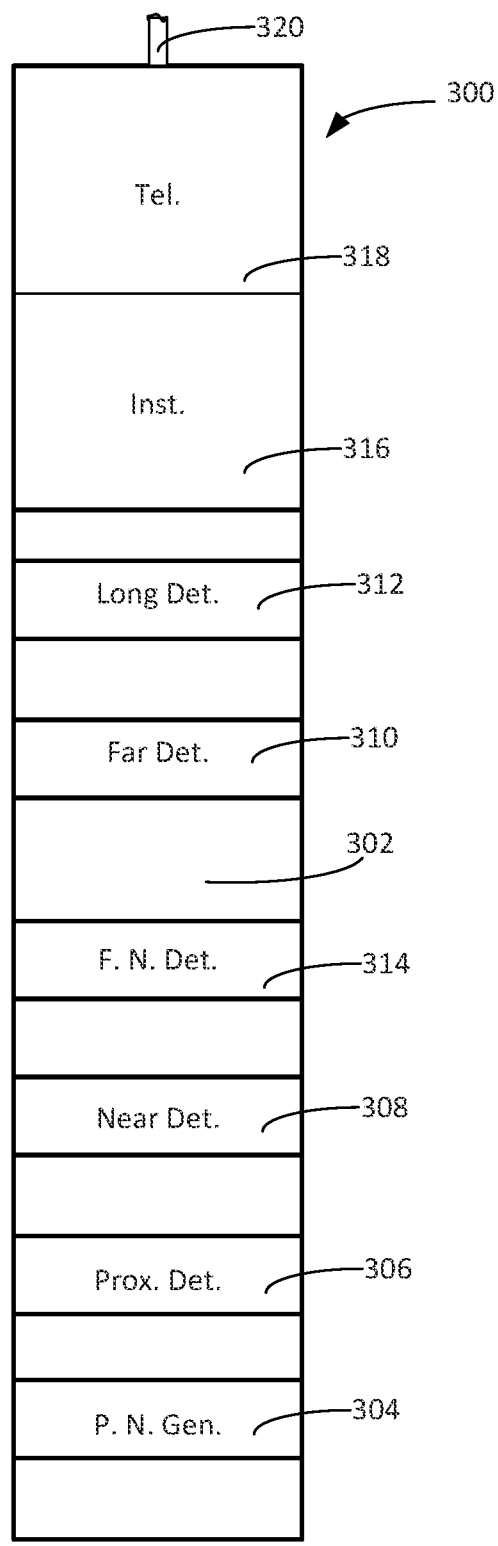
FIG. 3 shows an embodiment of a logging tool according to aspects of the disclosure.

FIG. 3 shows the layout of a typical pulsed neutron logging tool 300 according to the disclosure. Subsection 302 houses an array of detector assemblies as well as a pulsed neutron generator 304. More specifically, there are four detector assemblies in the illustrated embodiment, each comprising a $LaBr_3$ crystal coupled to a photomultiplier tube and a digital spectrometer for filtering and pulse inspection. These detector assemblies are referred to as the Proximal (Prox) detector assembly 306, the Near detector assembly 308, the Far detector assembly 310, and Long detector assembly 312. These detector assemblies are disposed at increasing axial spacings from the neutron generator 304, as their names imply. Between the near detector assembly 308 and the far detector assembly 310 is disposed a fast neutron detector 314 that measures the fast neutron flux.

The subsection 302 is operationally connected to an instrument subsection 316. The instrument subsection houses control circuits and power circuits to operate and control the elements of the subsection 302. A telemetry subsection 318 is operationally connected to the instrument section 316. A suitable connector connects the logging tool to a lower end of a preferably multiconductor logging cable 320. The upper end of the logging cable 320 terminates at a draw works, which is well known in the art and is not shown in the illustration. It should be noted that other embodiments of a logging tools are within the scope of the disclosure. For example, the illustrated embodiment is an example of a tool configured to be conveyed into a wellbore via a cable, such as logging cable 320. However, other embodiments may be included as a part or subsection of other conveyed components, for example, as part of a drilling string for LWD/MWD applications. Moreover, although shown embodied in a wireline logging tool, the detector assembly 302 can also be embodied in other borehole instruments. These instruments include pump-down ("memory") instruments conveyed by drilling fluid flow, instruments conveyed by coiled tubing, instruments conveyed by a drill string, and instruments conveyed by a "slick line".

Still referring to FIG. 3, detector assembly response data are telemetered from the tool 300 to the surface of the earth where they are received by an uphole telemetry unit (not shown) typically disposed within surface equipment. These data can be processed in a surface processor (not shown) within the surface equipment to yield a log of one or more parameters of interest. Alternately, data can be partially or completely processed in a downhole processor, for example, within the instrument section 316 and telemetered via the telemetry subsection 318 to the surface equipment. Control parameters can also be telemetered from the surface equipment to the tool 300 via the telemetry system and wireline cable 320.

Figure 4A:
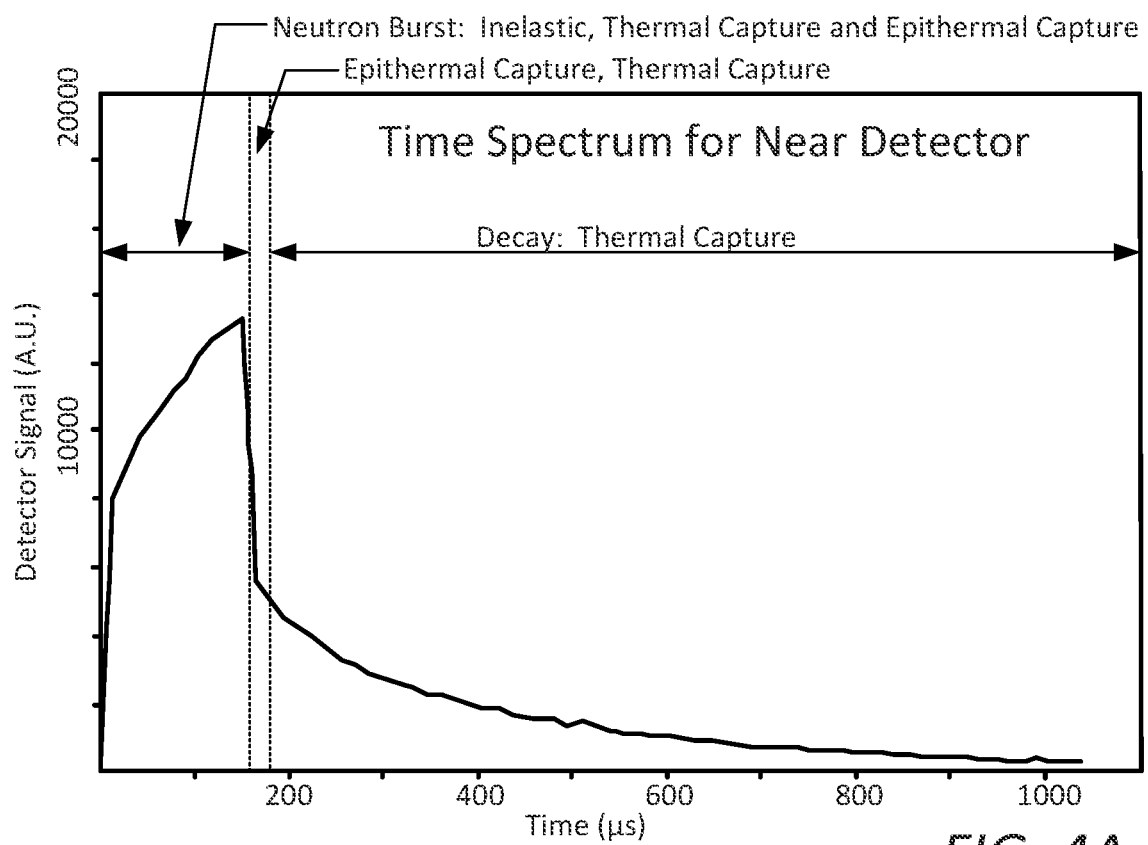
FIGS. 4A and 4B show pulsed neutron logging data.

FIG. 4A shows the temporal profile of the gamma ray count rate in one of the detectors (e.g., the near detector) during a pulsed neutron measurement. During the illustrated pulsed neutron measurement, the neutron generator generates neutrons during a burst lasting about 150 μs. During the neutron burst the gamma rays detected include gamma rays generated by inelastic scattering, thermal capture, and epithermal capture. Once the neutron burst is terminated, the detected gamma signal begins to decay, as is apparent in the illustrated neutron capture time decay spectrum. For a very short time following the burst, gamma rays due to epithermal and thermal neutron capture are detected, followed by a longer decay period during which all of the detected gammas arise from thermal capture events. The thermal capture portion of the spectrum arises from thermal capture events occurring in the borehole and from thermal capture events occurring in the formation. As explained in U.S. Pat. No. 11,048,015 (the '015 Patent), the entire contents of which are incorporated herein by reference, the thermal capture portion of the neutron capture time decay spectrum can be fit with a dual-exponential function. The dual exponential function can be used to determine the amplitudes and time constants for the borehole and the formation contributions. The values for the formation contribution can be used to determine the formation's macroscopic cross section for the absorption of thermal neutrons ($\Sigma$). The formation sigma depends on both the rock matrix and the formation fluids, and can be written as: Equation 1: $\Sigma=(1-\phi)\Sigma_m+\phi\Sigma_f$, where $\phi$ is the formation porosity, $\Sigma_m$ is the sigma of the matrix, and $\Sigma_f$ is the sigma of the formation fluids. The fluid sigma is the sum of the sigmas of the strongly neutron-capturing elements in the fluid, most notably hydrogen, chlorine, lithium, and boron.

The fluid sigma can be determined from a measured formation sigma by algebraically rearranging equation Eq. 1 once the matrix sigma, matrix porosity are known. The matrix sigma can be determined by measuring a low porosity section of formation. A dedicated porosity tool can be used to determine the matrix porosity. Alternatively, the porosity can be determined using the tool 300, using a calibrated two-detector capture ratio, as described in the incorporated '015 Patent and in "A New Cased Hole Porosity Measurement for a Four Detector Pulsed Neutron Logging Tool, SPE-195950, Schmid, et al., 2019. Any method of measuring matrix porosity can be used according to this disclosure.

Figure 4B:
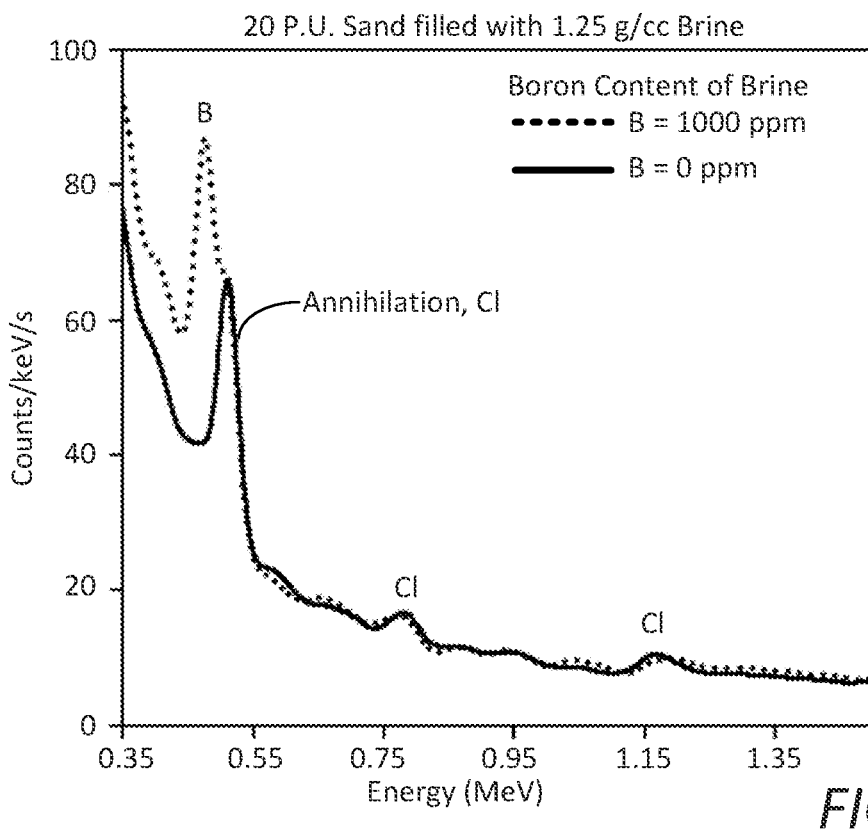

As is known in the art, the gamma rays resulting from neutron capture detected at any of the tool's detectors can be sorted as a function of gamma ray energy and histogrammed in an energy spectrum. Such a spectrum can then be fit to elemental standards and the elemental yields can be extracted. See, e.g., SPE191411, Pemper et al, 2018. Alternatively, the elemental yields can be extracted via background subtracted windows in the energy spectrum. Either way, it is known that the energy spectrum can provide an indication of the types of atoms participating in neutron capture and of their relative concentrations in the fluid. An example is shown in FIG. 4B, which illustrates capture energy spectra of a 20 porosity unit (P.U.) sand formation filled with 1.25 g/cc of brine. In this figure, two simulated capture spectra are shown overlaid. The scenarios are the same, except that one spectrum has a brine formation fluid with a 0 ppm boron content, and the second spectrum has a brine formation fluid with a 1000 ppm boron content. The boron and chlorine peaks in the spectra are easy to identify. These spectra were simulated with MCNP, a publicly available radiation transport code. The energy resolution function used in this study was obtained by way of measurements in the laboratory with radioactive sources. The energy spectrum shown in FIG. 4B demonstrates that boron is discernable in the energy spectrum and is not concealed by the 511 keV annihilation peak. Note that when service providers perform pulsed neutron logging measurements, they often do not consider gamma ray energies below 511 keV. However, since some embodiments of the disclosed methods involve determining boron concentrations from the capture energy spectrum, those embodiments require recording the lower energy portion of the spectrum, as illustrated in FIG. 4B.

This disclosure relates to methods and systems for using the fluid sigma and/or the capture spectrum (i.e., the energy spectrum of the capture gamma rays) to log the amounts of lithium in brines contained in formations traversed by a well bore. Logging lithium directly is problematic. Lithium is known to have a relatively high thermal neutron capture cross section, but thermal neutron capture by lithium does not produce gamma rays. Moreover, given the relatively low amount of lithium expected to be present in a formation brine (<1000 mg/l), that cross section is not high enough to create a robust signal that would be clearly detectable in a neutron capture time decay log (i.e., sigma log).

Figure 5:
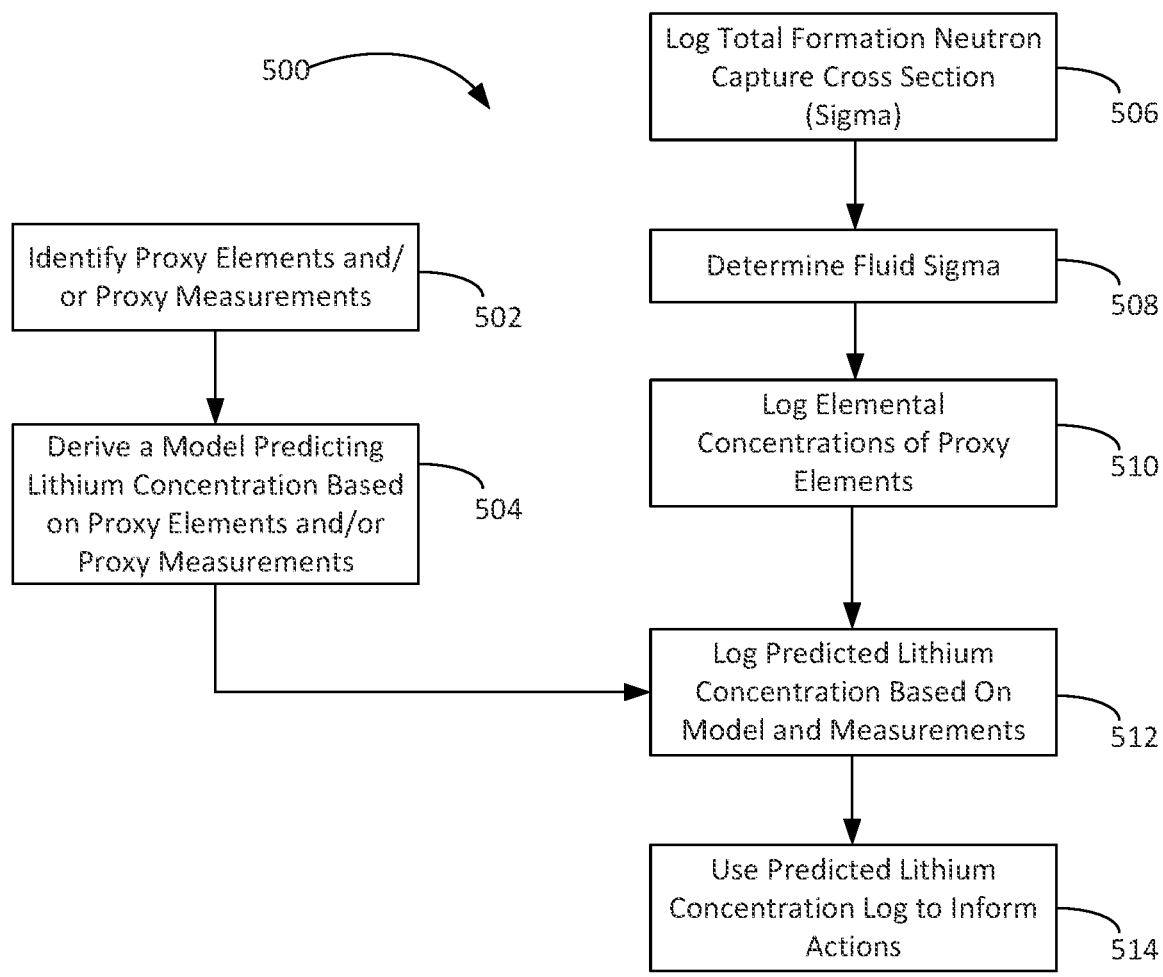
FIG. 5 shows workflow for predicting and logging lithium concentrations in formations traversed by a wellbore.

Despite the limitations of logging lithium directly, the inventors have discovered that lithium concentrations can be predicted indirectly and logged in formation brines based on measurements obtained using a logging tool, such as the tool 300. FIG. 5 illustrates an embodiment of a workflow 500 for predicting and logging lithium concentrations in a formation traversed by a wellbore. At step 502, one or more proxy elements and/or proxy measurements are identified. As used herein, the term "proxy element" refers to an element that is believed to be associated with lithium. Ideally, the proxy element is a strongly neutron capturing element that can readily quantified using a tool, such as the tool 300. As shown below, boron and chlorine may be used as proxy elements according to some embodiments. As used herein, the term "proxy measurement" refers to a measurement that is correlated to lithium concentration, even if it is not a direct measurement of lithium itself. As shown below, one example of a proxy measurement according to some embodiments is the thermal neutron capture cross section of the fluid (i.e., the formation fluid sigma). Another possible type of proxy measurement might be certain types of formations, like clays, that might be associated with Li deposits.

Figure 7:
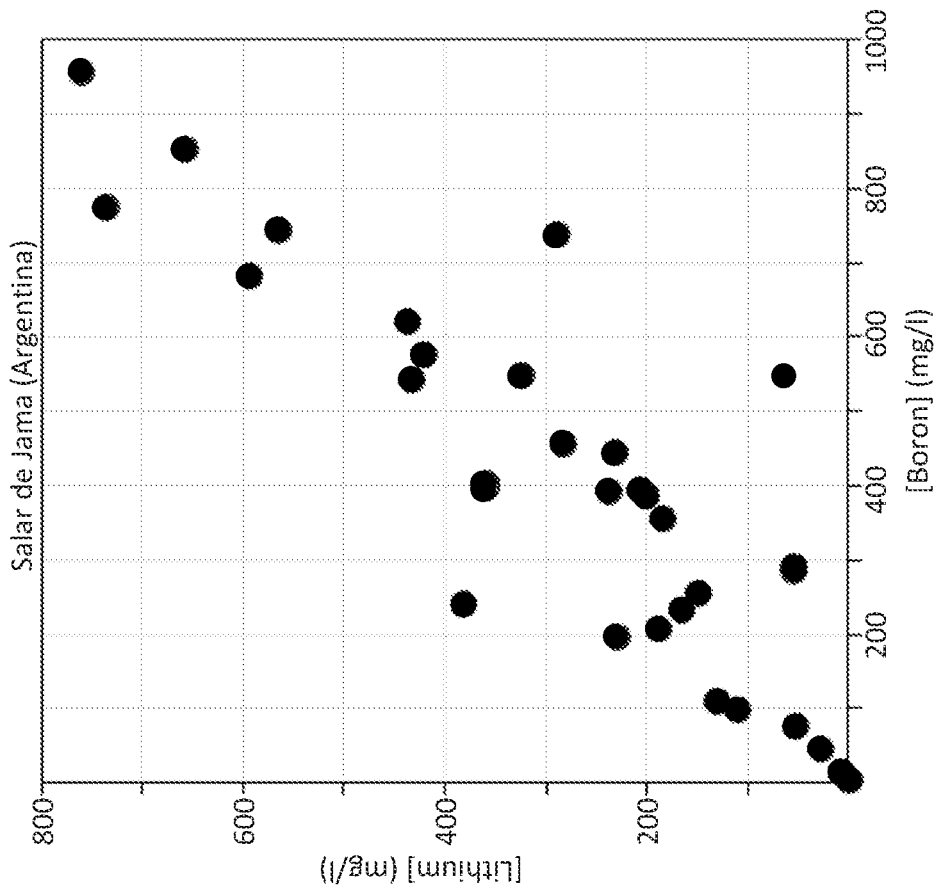
FIG. 7 shows a plot of lithium concentration as a function of boron concentration determined from wells in the Salar de Jama formation.
Figure 6:
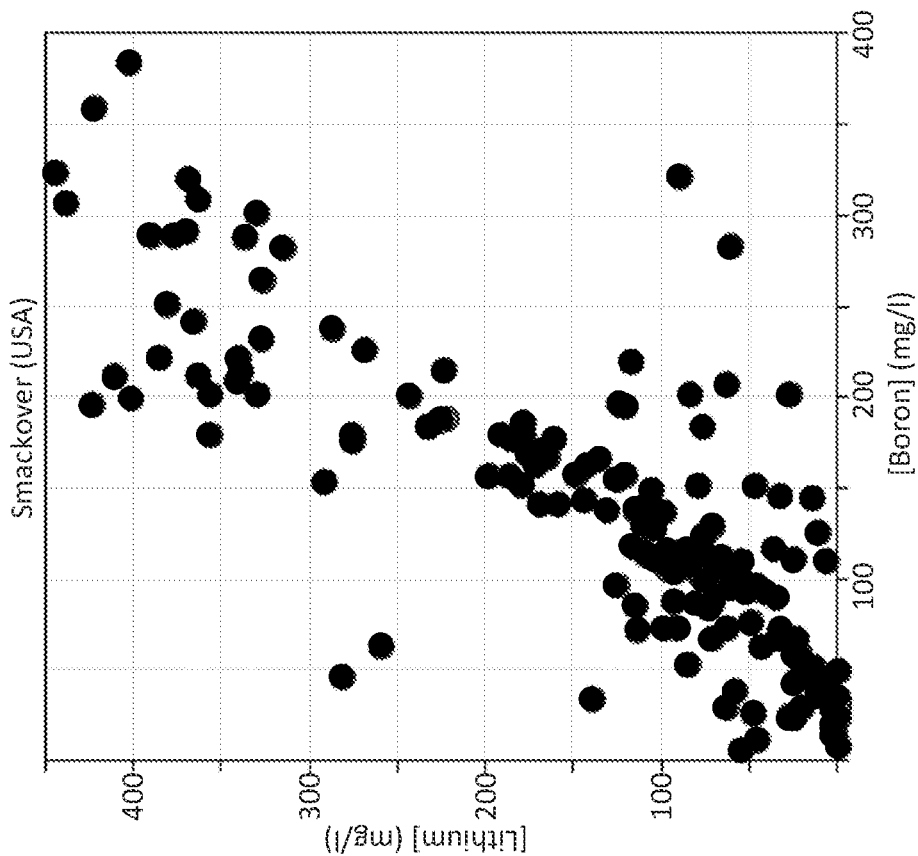
FIG. 6 shows a plot of lithium concentration as a function of boron concentration determined from wells in the Smackover formation.

Proxy elements and proxy measurements may be determined based on a theoretical understanding of factors that may predict particular elements or measurements to be correlated with lithium concentration. Alternatively, proxy elements and proxy measurements may be determined empirically based on one or more data sets (also referred to herein as databases) that may be used to correlate lithium concentration with other elemental concentrations and/or measurements. According to some embodiments, the data set may be specific to a particular formation of interest. For example, FIG. 6 illustrates a plot of lithium concentration as function of boron concentration determined in brine produced from wells in the Smackover formation located in Arkansas. The data set was obtained from the U.S. Geological Survey (USGS) National Produced Water Database, available at www.sciencebase.gov. Notice that the lithium concentration correlates strongly with the boron concentration, indicating that boron (which has a high neutron capture cross section per unit mass) may be a suitable proxy element for lithium, at least in that formation. FIG. 7 illustrates a plot of lithium concentration as function of boron concentration determined in brine produced from wells in the Salar de Jama formation in Argentina (as reported in "Review of Four Lithium Exploration Properties in Argentina", LSC Lithium Inc, Technical Report NI-43-101,2016). Again, notice that lithium concentration correlates strongly with the boron concentration, indicating that boron would be a suitable proxy element for lithium in that formation.

Figure 8:
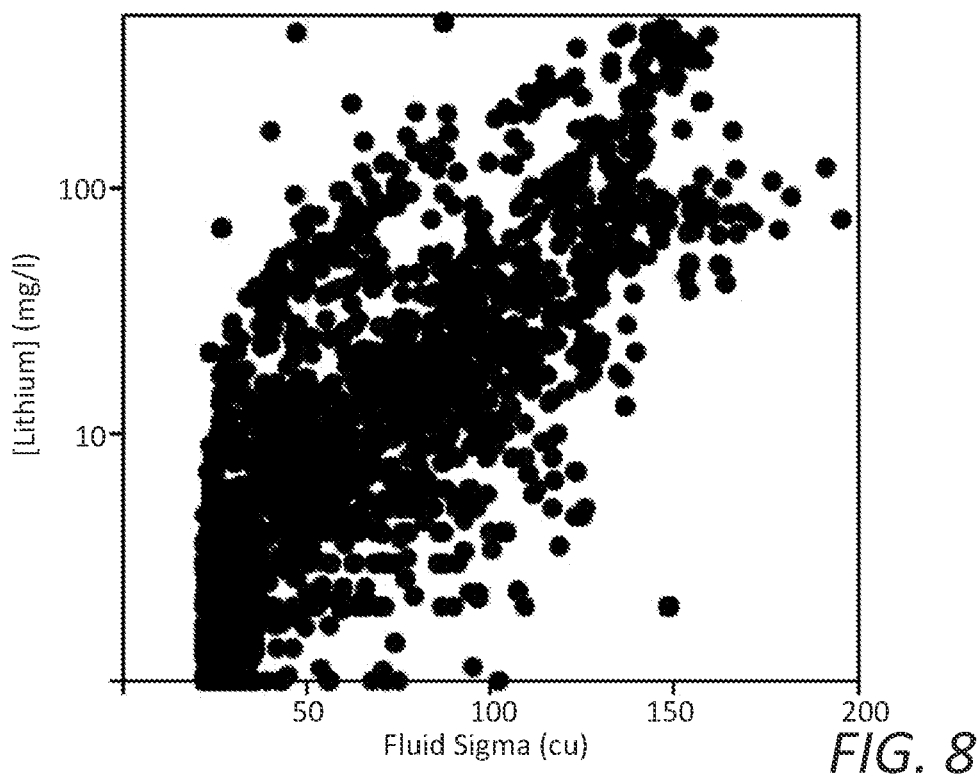
FIG. 8 shows a plot of lithium concentration as a function of fluid sigma for wells in the U.S. Geological Survey (USGS) National Produced Water Database.
Figure 9:
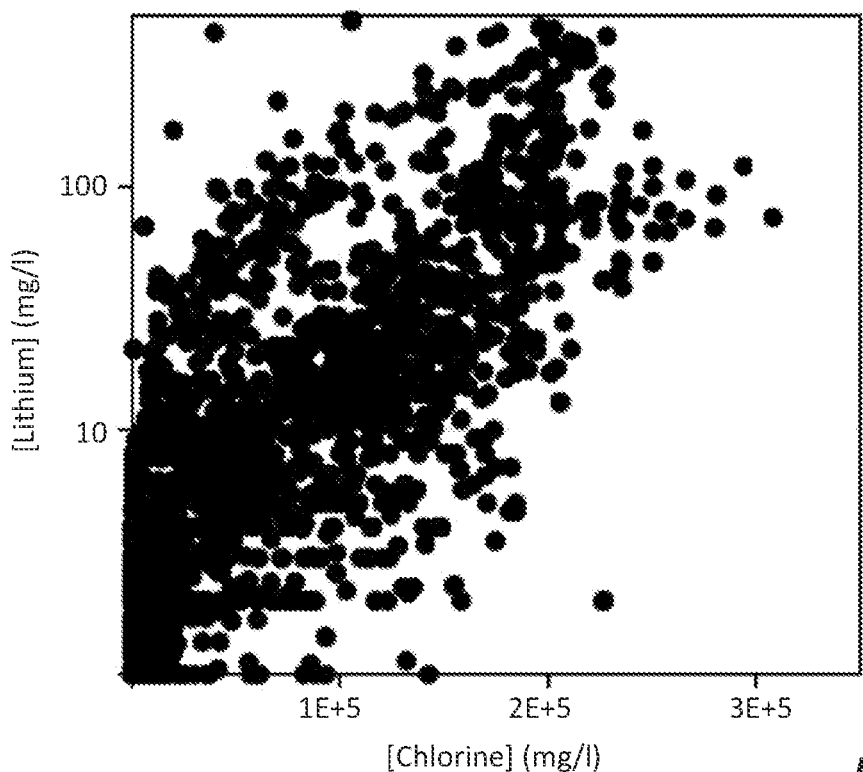
FIG. 9 shows a plot of lithium concentration as a function of chlorine concentration for wells in the USGS National Produced Water Database.
Figure 10:
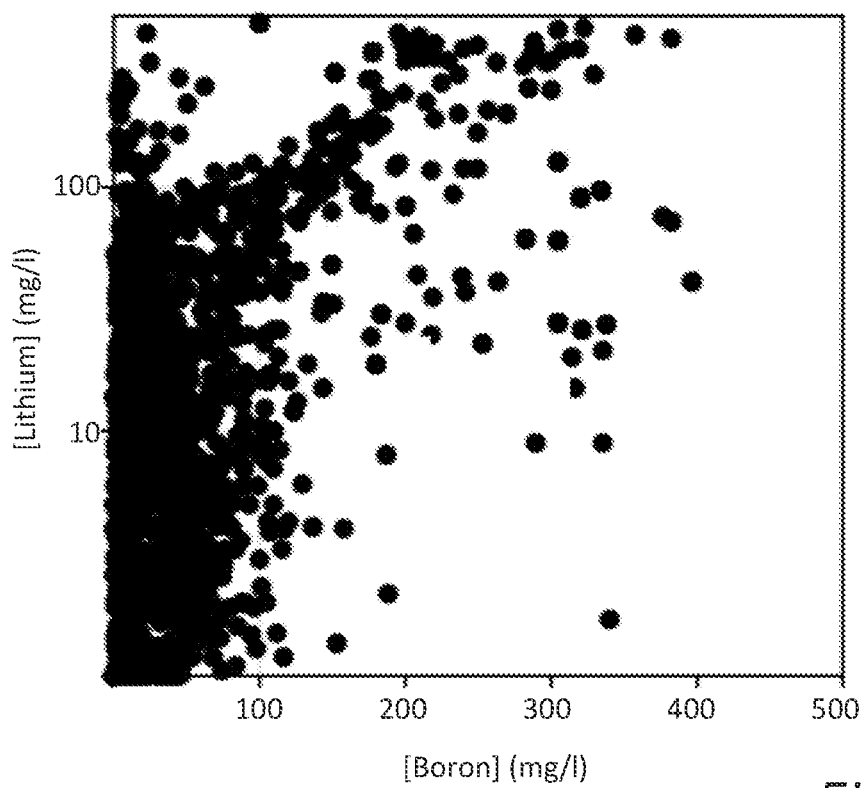
FIG. 10 shows a plot of lithium concentration as a function of boron concentration for wells in the USGS National Produced Water Database.

According to some embodiments, the data set(s) used to identify proxy elements and/or proxy measurements may comprise data collected over a plurality of formations. For example, FIG. 8 illustrates a plot of lithium concentration as a function of fluid sigma (expressed in capture units, c.u., in log-scale) for all wells included in the USGS National Produced Water Database, available at www.sciencebase.gov. The fluid sigma for produced water from each well can be calculated based on the sigma values of all of the constituents of the fluids for each tabulated well. Notice that the fluid sigma correlates somewhat with lithium concentration, though the correlation is not ideal. The fact that there is some degree of correlation suggests that the fluid sigma may be used as a proxy measurement to model lithium concentration, as described in more detail below. FIGS. 9 and 10 illustrate plots of lithium concentration as a function of chlorine concentration and as a function of boron concentration, respectively, for all wells included in the USGS National Produced Water Database. Generally, higher chlorine concentrations correlate to higher lithium concentration, but the correlation is not ideal. Likewise, boron concentration correlates somewhat with lithium concentration at higher concentrations. The correlations of each of chlorine and boron with lithium suggests that those elements may be used as proxy elements to model lithium concentration, as described in more detail below. It should be noted that, according to some embodiments, various pattern recognition methods known in the art may be used to identify correlations between lithium concentration and other elements and/or measurements in data sets.

Figure 11:
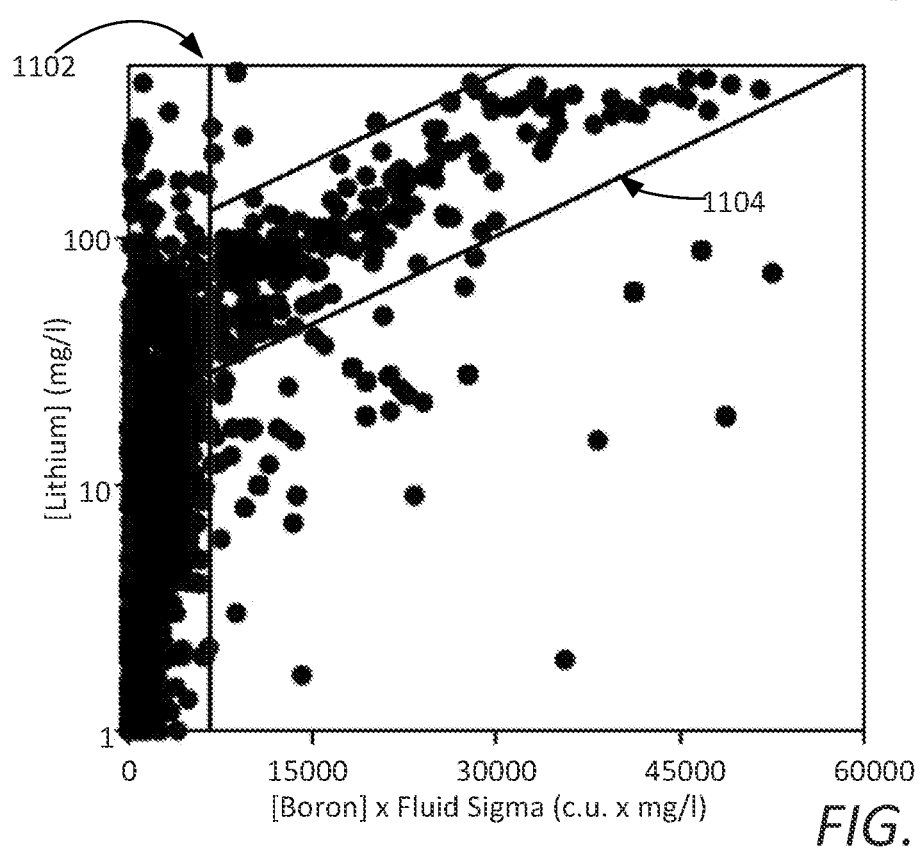
FIG. 11 shows a model for predicting lithium concentration using boron as a proxy element and fluid sigma as a proxy measurement.

Referring again to FIG. 5, at step 504 once potential proxy elements and/or proxy measurements have been identified, those potential proxy elements and/or proxy measurements can be used to derive a model for predicting lithium concentration. How the model is derived may vary depending on factors such as the number of potential proxy elements and/or proxy measurements and on the extent of correlation between the proxies and the lithium concentration. For example, referring again to FIGS. 6 and 7, the correlations between boron and lithium concentrations in the individual formations appear quite good. In such cases, the model may comprise using only one proxy element (i.e., boron) and fitting a mathematical function (such as a linear function) to the whole data set. It will be appreciated that other mathematical functions (polynomial, spline functions, etc.) may be used. Referring again to FIGS. 8, 9, and 10, the correlations between the proxies and lithium concentration determined over a large number of wells is not ideal. The inventors have found that these proxies can still be used to model lithium concentration by deriving more complex models. For example, FIG. 11 shows a plot of lithium concentration (plotted in log scale) as a function of the product of boron concentration multiplied by the fluid sigma for all wells included in the USGS National Produced Water Database. Notice that at higher lithium concentrations the correlation is quite good. A key idea according to some embodiments is that the model is derived by multiplying two (or more) proxies together. The model further comprises identifying a low-concentration cut-off 1102, below which the lithium concentration cannot be determined. Above the cut-off 1102 is a high-correlation region 1104 where the lithium concentration is strongly correlated with the product of boron concentration multiplied by the fluid sigma. The data in the high-correlation region 1104 can be fit to a mathematical function, such as a linear function, and used to model lithium concentration above the cut-off value.

Figure 12:
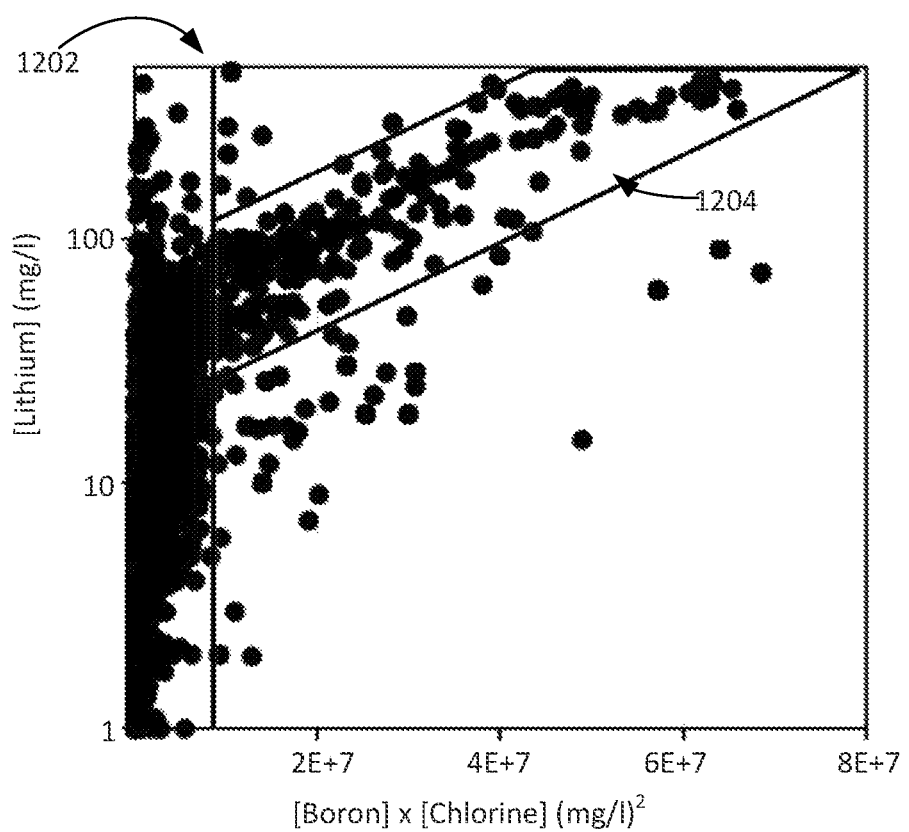
FIG. 12 shows a model for predicting lithium concentration using boron and chlorine as proxy elements.

FIG. 12 illustrates a similar model, but this time using a product of boron concentration and chlorine concentration. Deriving the model comprises multiplying the two proxies (i.e., the boron and chlorine concentrations), determining a low-concentration cut-off 1202, identifying a high-correlation region 1204, and fitting the data in the high-correlation region to a mathematical function. The mathematical function can be used to estimate the lithium concentration based on the product of the boron and chlorine concentrations (for values above the low-concentration cut-off).

It will be appreciated that models in addition to the ones illustrated here will be apparent to those of skill in the art. For example, products of more than two proxy elements and/or measurements may be used. Also, the proxies may be mathematically combined in other ways besides simply multiplying them together. The models may be determined empirically by trying various combinations of proxies to determine a combination that correlates strongly with lithium concentration. Various pattern recognition/pattern optimization techniques may be used to identify and derive the models. Also, as more data is collected and more produced fluids are analyzed, the datasets/databases upon which the models are based may be updated and/or the models may be refined.

Referring again to FIG. 5, at step 506 the total formation neutron capture cross section of the formation traversed by the wellbore is logged. As described above, a tool, such as the pulsed neutron logging tool 300 is conveyed within the wellbore. The tool emits fast neutrons into the area surrounding the wellbore and detects gamma rays resulting from interactions of the neutrons with the various components. Among the detected gamma rays will be capture gamma rays, as described above. The neutron capture time decay spectrum can be used to determine the total formation neutron capture cross section of the formation, as described above. At step 508 the fluid sigma can be determined using the total formation neutron capture cross section, the porosity, and the matrix sigma, as described above (Eq. 1). As described above, the fluid sigma may be used as a proxy measurement. At step 510 the concentrations of proxy elements, such as chlorine and/or boron can be logged using spectral fitting or windows in the gamma ray energy spectrum, as described above. Here we should note that some embodiments of pulsed neutron tools may incorporate boron shielding coated around the detectors. If boron is being logged as a proxy element, the boron shielding must either be removed or the boron shielding must be accounted for in the measurement, for example, by taking baseline measurements. In the example discussed above (FIG. 5) there was no boron shield, and the boron signal is seen to come entirely from the formation fluid.

At step 512 the model (derived at step 504) is used to determine the lithium concentration using the proxy measurements (e.g., fluid sigma, step 508) and/or the concentrations of proxy elements (step 510). As has been shown, the product of two proxies is a particularly good model to use. The concentration of lithium that is derived can then be plotted on a log as a function of depth, as is well known for other quantities in wellbore logging. At step 514, the predicted lithium concentration log may be used to make decisions concerning actions to take with respect to the well. For example, water produced from formations predicted to be rich in lithium may be isolated for lithium recovery. According to some embodiments, a service provider may decide to perforate the casing of the wellbore in a formation that is predicted to be rich in lithium. Other actions will be apparent to those of skill in the art.

Some portions of the detailed description were presented in terms of processes, methods, programs, and workflows. These processes, methods, programs, and workflows are the means used by those skilled in the data processing arts to most effectively convey the substance of their work to others skilled in the art. A process or workflow is here, and generally, conceived to be a self-consistent sequence of steps (instructions) contained in memory and run using processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability. According to some embodiments, the models and/or databases may be stored in a non-transitory computer-readable medium.

While the invention herein disclosed has been described in terms of specific embodiments and applications thereof, numerous modifications and variations could be made thereto by those skilled in the art without departing from the scope of the invention set forth in the claims.

What is claimed is:

1. A method of determining a concentration of lithium contained within a brine in a formation traversed by a wellbore, the method comprising:
   using data from a pulsed neutron logging tool in the wellbore to determine a concentration of one or more proxy elements in the brine, wherein the one or more proxy elements do not comprise lithium, and
   using the determined concentration of the one or more proxy elements to determine the concentration of lithium in the brine.

2. The method of claim 1, wherein the one or more proxy elements comprise boron or chlorine.

3. The method of claim 1, wherein the data comprises a thermal neutron capture energy spectrum.

4. The method of claim 1, wherein using the determined concentration of the one or more proxy elements to determine the concentration of lithium comprises using a model that models lithium concentration as a function of concentrations of the one or more proxy elements.

5. The method of claim 4, wherein the model models lithium concentration as a function of two or more proxy elements.

6. The method of claim 5, wherein the function is a product of the two or more proxy elements.

7. The method of claim 4, wherein the model is determined using a database comprising elemental concentration values determined for brines produced from a plurality of wells, wherein the elemental concentration values for each of the wells comprise concentration values for lithium and concentration values for the one or more proxy elements.

8. The method of claim 7, wherein the model models lithium concentration as a function of concentrations of the one or more proxy elements combined with fluid sigma.

9. The method of claim 8, wherein the fluid sigma for the model is determined based on the database.

10. The method of claim 9, wherein determining the fluid sigma value for the brine comprises:
fitting a dual exponential decay function to the capture time decay spectrum,
using the dual exponential decay function to determine a borehole contribution and a formation contribution to the neutron capture time decay spectrum, and
using the formation contribution to the neutron capture time decay spectrum to determine the fluid sigma value for the brine.

11. The method of claim 8, wherein the model models lithium concentration as a product of the one or more proxy elements multiplied by the fluid sigma.

12. The method of claim 8, wherein the model models lithium concentration as a product of the boron concentration times fluid sigma.

13. The method of claim 12, further comprising using the neutron capture time decay spectrum to determine a fluid sigma value for the brine.

14. The method of claim 8, wherein the model models lithium concentration as a product of the boron and the chlorine concentrations.

15. The method of claim 8, wherein the data from the pulsed neutron logging tool further comprises a neutron capture time decay spectrum.

16. A non-transitory computer-readable medium comprising instructions for execution by a computer for determining a concentration of lithium contained within a brine in a formation traversed by a wellbore, wherein the instructions are configured to cause the computer to:
receive data generated using a pulsed neutron logging tool in the wellbore,
use the data to determine a concentration of one or more proxy elements in the brine, wherein the one or more proxy elements do not comprise lithium, and
use the determined concentration of the one or more proxy elements to determine the concentration of lithium in the brine.

17. The computer-readable medium of claim 16, wherein the one or more proxy elements comprise boron or chlorine.

18. The computer-readable medium of claim 16, wherein the data from the pulsed logging tool comprises a thermal neutron capture energy spectrum.

19. The computer-readable medium of claim 16, further comprising a model that models lithium concentration as a function of concentrations of the one or more proxy elements.

20. The computer-readable medium of claim 19, wherein the model is determined using a database comprising elemental concentration values determined for brines produced from a plurality of wells, wherein the elemental concentration values for each of the wells comprise concentration values for lithium and concentration values for the one or more proxy elements.

21. The computer-readable medium of claim 19, wherein the model models lithium concentration as a function of concentrations of the one or more proxy elements combined with fluid sigma.

22. The computer-readable medium of claim 21, wherein the instructions further configure the computer to use the data to determine a fluid sigma value for the brine.

* * * * *